US009844283B2

(12) United States Patent
Bacallao (10) Patent No.: US 9,844,283 B2
(45) Date of Patent: Dec. 19, 2017

(54) BAGGING STATION SUPPORT FRAME AND METHOD OF FORMING THE SAME

(71) Applicant: Wal-Mart Stores, Inc., Bentonville, AR (US)

(72) Inventor: Yurgis Mauro Bacallao, Centerton, AR (US)

(73) Assignee: WAL-MART STORES, INC., Bentonville, AR (US)

( * ) Notice: Subject to any disclaimer, the term of this patent is extended or adjusted under 35 U.S.C. 154(b) by 0 days.

(21) Appl. No.: 15/381,552

(22) Filed: Dec. 16, 2016

(65) Prior Publication Data

US 2017/0172322 A1   Jun. 22, 2017

Related U.S. Application Data (60) Provisional application No. 62/270,881, filed on Dec. 22, 2015, provisional application No. 62/375,691, filed on Aug. 16, 2016.

(51) Int. Cl.
| | | |
|---|---|---|
| A47F 9/04 | (2006.01) | |
| B65B 67/12 | (2006.01) | |
| F16M 13/02 | (2006.01) | |

(52) U.S. Cl.
CPC .......... *A47F 9/042* (2013.01); *B65B 67/1227* (2013.01); *B65B 67/1233* (2013.01);
(Continued)

(58) Field of Classification Search
USPC ..... 211/119.004, 90.01, 105, 118, 16, 85.15, 211/85.24, 85.31, 88.04, 90.03, 94.03,
(Continued)

(56) References Cited

U.S. PATENT DOCUMENTS 911,568 A * 2/1909 Bickford .............. A47G 1/1646
  16/DIG. 4
1,357,280 A * 11/1920 Dulle .................. A47G 1/1686
  248/490
(Continued)

FOREIGN PATENT DOCUMENTS

| CN | 102358484 A | 2/2012 |
|---|---|---|
| CN | 102747813 B | 12/2014 |

(Continued)

OTHER PUBLICATIONS

Search Report in counterpart UK Patent Application No. 1621383.7, dated Mar. 20, 2017; 5 pages.
(Continued)

*Primary Examiner* — Alfred J Wujciak
(74) *Attorney, Agent, or Firm* — Schmeiser, Olsen & Watts LLP (57) ABSTRACT

Disclosed is a bagging station support frame that includes a bagging station holder and a rail coupler coupled to the bagging station holder. The bagging station holder holds a bagging station. A bagging station holds a plurality of shopping bags ready to receive products purchased by a customer. The rail coupler couples the bagging station support frame to a rail. Rails are common fixtures throughout retail stores. The bagging station support frame can be coupled to a rail at various locations throughout the retail store. A bagging station coupled to the bagging station support frame will be available for customers to bag their purchases wherever the bagging station support frame with bagging station is mounted. By mounting bagging station support frames with bagging stations throughout the retail store, customers can easily bag their purchases as they shop, without having to find a checkout counter to obtain shopping bags.

13 Claims, 7 Drawing Sheets

(52) U.S. Cl.
CPC ......... *B65B 67/1266* (2013.01); *F16M 13/02* (2013.01); *B65B 2067/1294* (2013.01)

(58) Field of Classification Search
USPC ........ 211/94.02, 119.001, 119.003; 248/235, 248/249, 250, 690, 490, 301, 304, 339, 248/340, 211, 215, 227.4
See application file for complete search history.

(56) References Cited

U.S. PATENT DOCUMENTS

| | | | |
|---|---|---|---|
| 2,270,796 A * | 1/1942 | Hauser | A47G 25/08 211/119.004 |
| 2,920,854 A * | 1/1960 | Morse, Jr. | A47G 25/0607 248/217.4 |
| 2,925,916 A * | 2/1960 | Pollock | A47B 61/02 211/119.004 |
| 4,199,122 A | 4/1980 | Christie | |
| 4,305,558 A | 12/1981 | Baker | |
| 4,949,924 A * | 8/1990 | Carmody | A47H 27/00 248/215 |
| 4,998,694 A | 3/1991 | Barteaux | |
| 5,152,404 A | 10/1992 | Salrin et al. | |
| 5,170,719 A * | 12/1992 | Pestone | A47B 5/04 108/134 |
| 5,395,080 A | 3/1995 | Smith | |
| 5,437,346 A | 8/1995 | Dumont | |
| 5,439,120 A | 8/1995 | Brozak | |
| 5,465,846 A | 11/1995 | Blyth et al. | |
| 5,485,932 A * | 1/1996 | Romm | A47B 57/50 211/103 |
| 5,695,073 A * | 12/1997 | Klein | A47B 61/04 211/113 |
| 6,042,063 A | 3/2000 | Kerr et al. | |
| 6,089,514 A | 7/2000 | Huang et al. | |
| 6,155,521 A | 12/2000 | O'Hanlon | |
| 6,267,334 B1 | 7/2001 | Siu | |
| 6,543,638 B2 | 4/2003 | Wile | |
| 6,726,156 B1 | 4/2004 | Scola | |
| 7,530,537 B2 | 5/2009 | Kandah | |
| 7,677,507 B1 | 3/2010 | Rothbauer et al. | |
| 7,850,018 B2 | 12/2010 | Galle | |
| 8,196,873 B2 | 6/2012 | Kohn et al. | |
| 8,857,347 B1 * | 10/2014 | Liu | A47B 5/02 108/47 |
| 2007/0228678 A1 | 10/2007 | Solomon et al. | |
| 2011/0266092 A1 | 11/2011 | Marquis et al. | |
| 2015/0083677 A1 | 3/2015 | Tan | |
| 2015/0103539 A1 | 4/2015 | Lee | |

FOREIGN PATENT DOCUMENTS

| | | |
|---|---|---|
| GB | 2200035 A | 7/1988 |
| JP | 2015217972 A | 12/2015 |
| WO | 2008054720 A2 | 5/2008 |
| WO | 2015030704 | 3/2015 |

OTHER PUBLICATIONS

"Econoco sh/5h—5 Hook Faceour, Pack of 24," Econoco, Google.com/shopping, accessed on Oct. 16, 2015; 1 page.
"Deck Joist Tie 14 Ga.," HomeDepot.ca, accessed on Apr. 27, 2017; 2 pages.
"Metal Building Materials C Z Purlin Wall Girt Manufacture," ADTOMall.com, accessed on Apr. 27, 2017; 2 pages.
"Tripp Lite 4U Hinged Wall Mount Patch Panel Bracket," Amazon.com, accessed on Apr. 27, 2017; 1 page.
5-Opening 4 in. x6 in. Pallet Picture Frame, Pannacle, HomeDepot.com, accessed on Apr. 27, 2017; 1 page.
"POS Check Out Plastic Bag Holder Dispenser for Retail Supermarket Brand New!" Ebay.com, accessed on Nov. 17, 2016; 5 pages.
"Lot 2 Royston Plastic Grocery Bag Holder Dispenser Stand Point of Sale Shopping," TeraPeak.com, accessed on Nov. 17, 2016; 3 pages.
"Bag Holders," ULINE.mx, accessed on Nov. 17, 2016; 1 page.
"OEM Express Checkout Counter / Customized Supermarket Cash Register Stands Counters," Guangzhou ECO Commerical Equipment Co., Ltd, SupermarketCheckoutCounters.com, accessed on Nov. 17, 2016; 3 pages.

* cited by examiner

BAGGING STATION SUPPORT FRAME AND METHOD OF FORMING THE SAME

CROSS REFERENCE TO RELATED APPLICATIONS

This invention claims priority to U.S. provisional patent application Ser. No. 62/270,881, filed Dec. 22, 2015 to Applicant Wal-Mart Stores Inc., and entitled "Bagging Station Support Frame and Method of Forming the Same", and U.S. provisional patent application Ser. No. 62/375,691, filed Aug. 16, 2016 to Applicant Wal-Mart Stores Inc., and entitled "Bagging Station Support Frame and Method of Forming the Same", which are included entirely herein by reference.

BACKGROUND OF THE INVENTION

Technical Field

This invention relates to retail store fixtures, and specifically to a support frame to hold a bagging station in a retail store.

State of the Art

A bagging station is a device that holds a stack of shopping bags, usually plastic shopping bags, and dispenses these shopping bags to be filled with products a customer purchases. Bagging stations are placed at checkout counters so that baggers can place products that have gone through checkout in a bag from the bagging station. There are mounting structures for bagging stations at checkout counters, because until recently, a customer purchased their products at checkout counters, and those products were also bagged at the checkout counters. With the advent of electronic purchasing and self-checkout by a customer, products can now be loaded into bags anywhere in a store. Customers can purchase their products electronically as they shop, and can load the products into a bag on their own. There is a need for bagging stations in locations in retail stores besides at the checkout counter.

Accordingly, what is needed is a fixture to hold a bagging station, where the fixture can be easily mounted at various places throughout a retail store, not just at checkout registers.

DETAILED DESCRIPTION OF EMBODIMENTS OF THE INVENTION

As discussed above, embodiments of the present invention relate to retail store fixtures, and specifically to a support frame to hold a bagging station in a retail store. Disclosed herein is a bagging station support frame that includes a bagging station holder and a rail coupler coupled to the bagging station holder. The bagging station holder holds a bagging station. A bagging station holds a plurality of shopping bags ready to receive products. The rail coupler couples the bagging station support frame to a rail. The bagging station support frame can be coupled to a rail anywhere in a retail store. A bagging station coupled to the bagging station support frame will be available for customers to bag their purchases wherever the bagging station support frame with bagging station is mounted. By mounting bagging station support frames with bagging stations throughout the retail store, customers can easily bag their purchases as they shop, without having to go to a checkout counter to obtain shopping bags.

A bagging station is a device that holds a stack of shopping bags, usually plastic shopping bags, and dispenses these shopping bags as they are being filled with products a customer purchases. Bagging stations are placed at checkout counters so that baggers can place products that have gone through checkout in a bag at the bagging station. There are mounting structures for bagging stations at checkout counters, because until recently, a customer purchased their products at checkout counters, and those products were also bagged at the checkout counters. With the advent of electronic purchasing and self-checkout by a customer, products can be loaded into bags anywhere in a store. Customers can purchase their products electronically as they shop, and can load the products into a bag on their own. There is a need for bagging stations in locations in retail stores besides at the checkout counter. The disclosed bagging station support frame is easily mounted to rails found throughout a retail store. The bagging station support frame holds a bagging station, making these bagging stations available to customers at various places in the retail store.

The disclosed bagging station support frame includes a means to hold a bagging station, and a means to couple the means to hold the bagging station to a rail. A "rail" as used herein, is any rigid fixture found in a retail store with a length longer than its width or diameter, that the means to hold the bagging station can couple to. With the bagging station support frame able to couple to rails that can be found in numerous locations throughout a retail store, a bagging station mounted to the bagging station support frame is available to shoppers to use while shopping. In some embodiments, the bagging station support frame is coupled to more than one rail. In some embodiments, the bagging station support frame includes a means to couple the means to hold the bagging station to a first rail, and a means to couple the means to hold the bagging station to a second rail.

Figure 1:
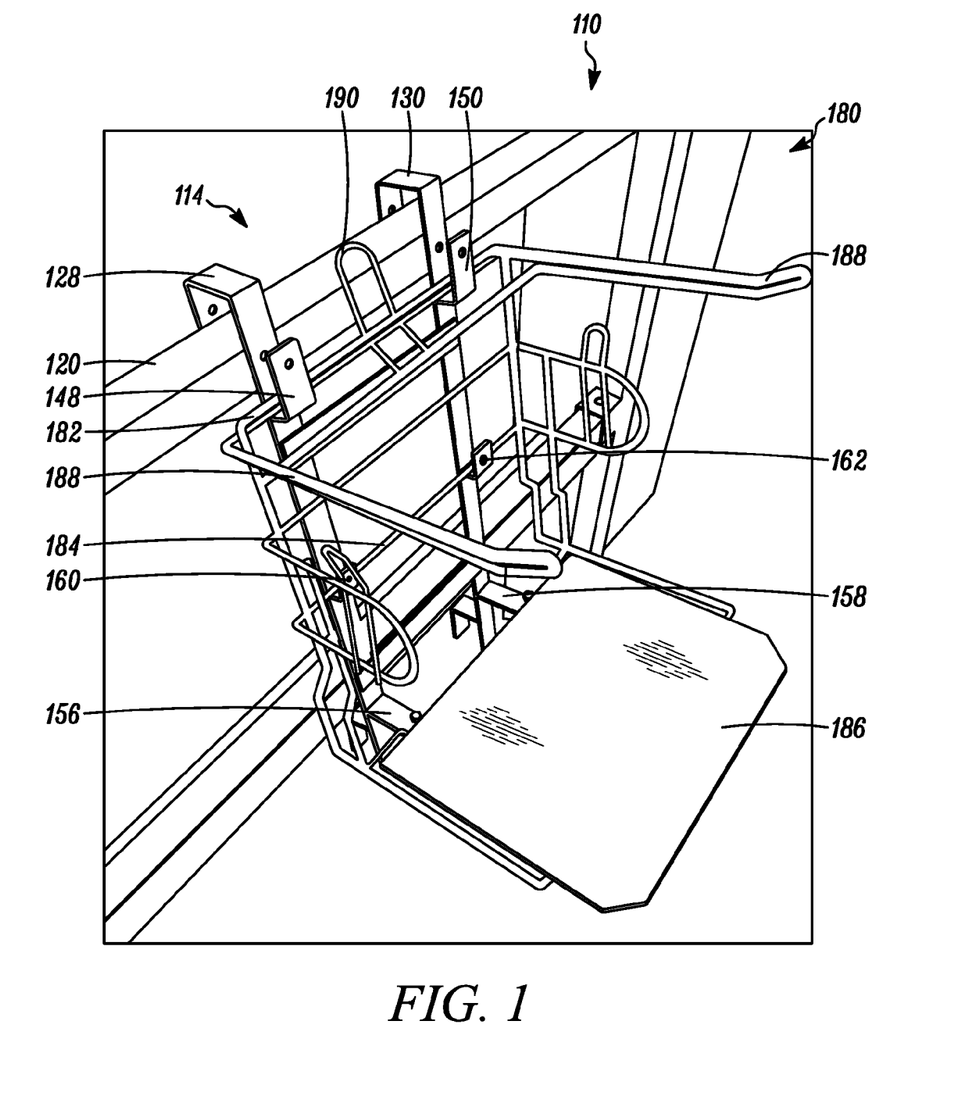
FIG. 1 shows a perspective view of a bagging station mounted to a bagging station support frame.

FIG. 1 shows a bagging station support frame 110, with a bagging station 180 coupled to bagging station support frame 110. Bagging station 180 is used to hold and dispense shopping bags. Bagging station 180 is usually mounted at checkout registers in a retail store. A stack of plastic shopping bags is hung on a shopping bag hook 190, with the handles hung from each of bagging station arms 188. Each bag is pulled open to fill it, with items placed in the bags and the bag being supported by a bagging station bottom plate 186. The job of filling shopping bags with products is typically performed by a store employee—a bagger—at the checkout register. But with the advent of electronic checkout, a customer can now purchase and bag products as they shop. Bagging station support frame 110 makes it possible to mount bagging station 180 wherever a rail can be found in the retail store that can hold bagging station support frame 110. Rails are common fixtures in retail stores, used to hold shelves, signs, and other store fixtures. FIG. 1 shows bagging station support fixture 110 mounted to a square rail 120. Bagging station support fixture 110 can be mounted to rails of many sizes and shapes, as will be explained herein. Mounting bagging station support frame 110 to a rail at a location in the retail store convenient for shopping customers, and then mounting a bagging station 180 to bagging station support frame 110, provides a way for customers to bag their purchases as they shop.

Figure 2:
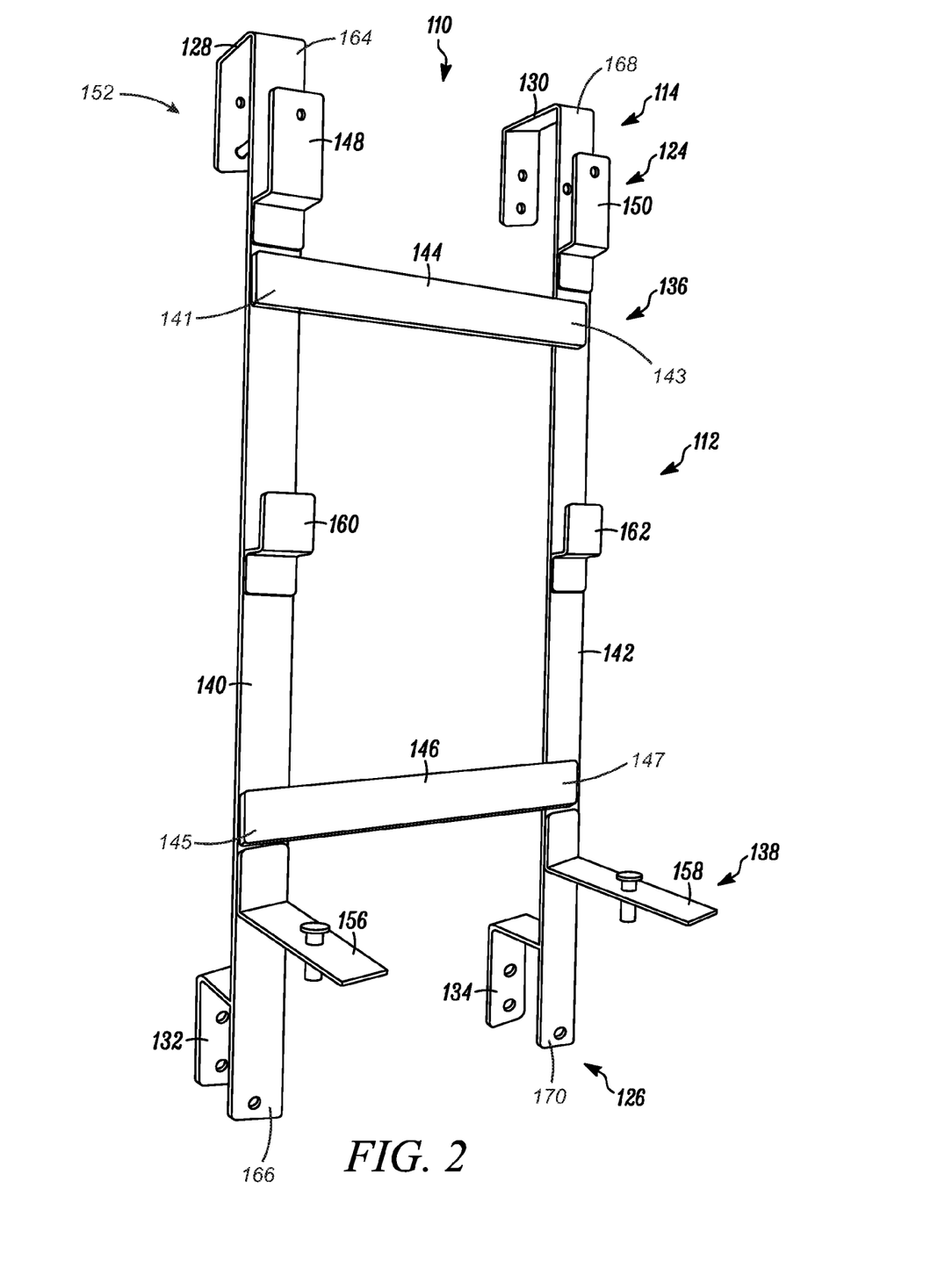
FIG. 2 shows a perspective view of a bagging station support frame.
Figure 3:
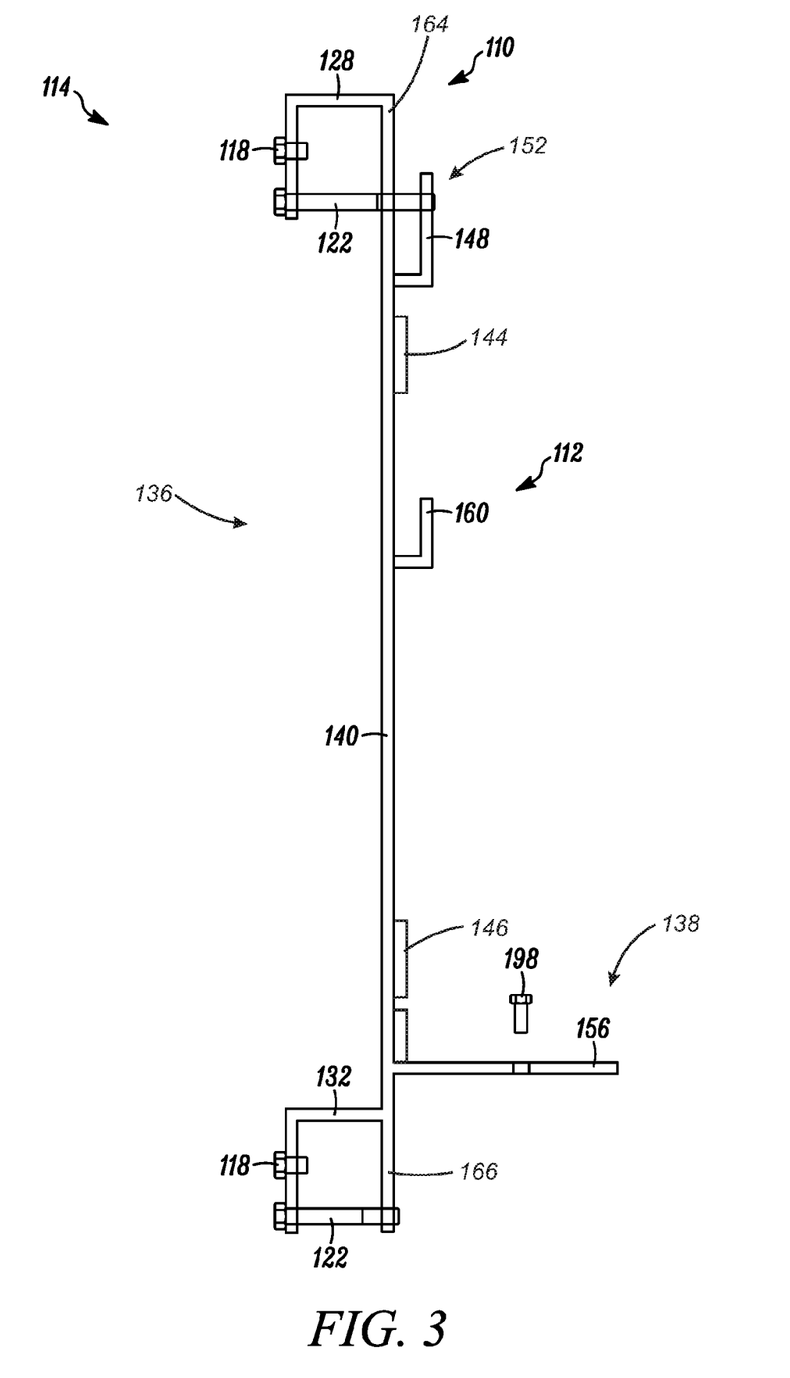
FIG. 3 shows a side view of a bagging station support frame.
Figure 4:
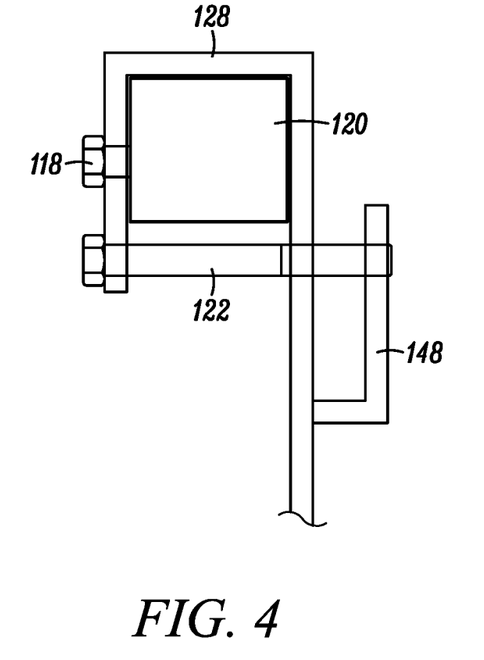
FIG. 4 shows a side close-up view of a top rail coupler hook of a bagging station support frame coupled to a square rail.
Figure 5:
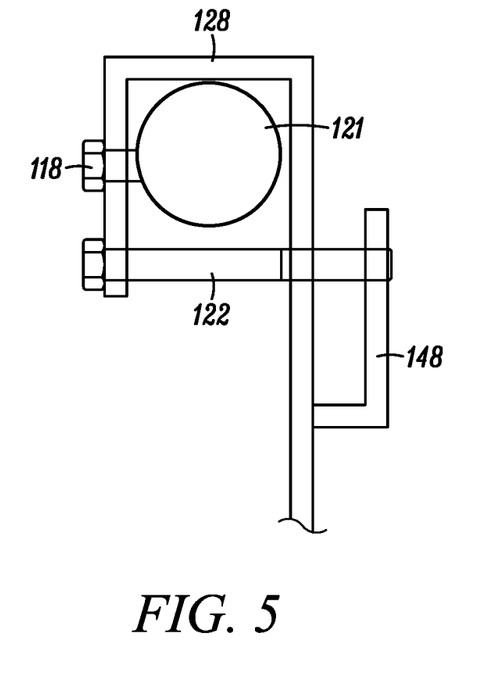
FIG. 5 shows a side close-up view of a top rail coupler hook of a bagging station support frame coupled to a round rail.
Figure 6:
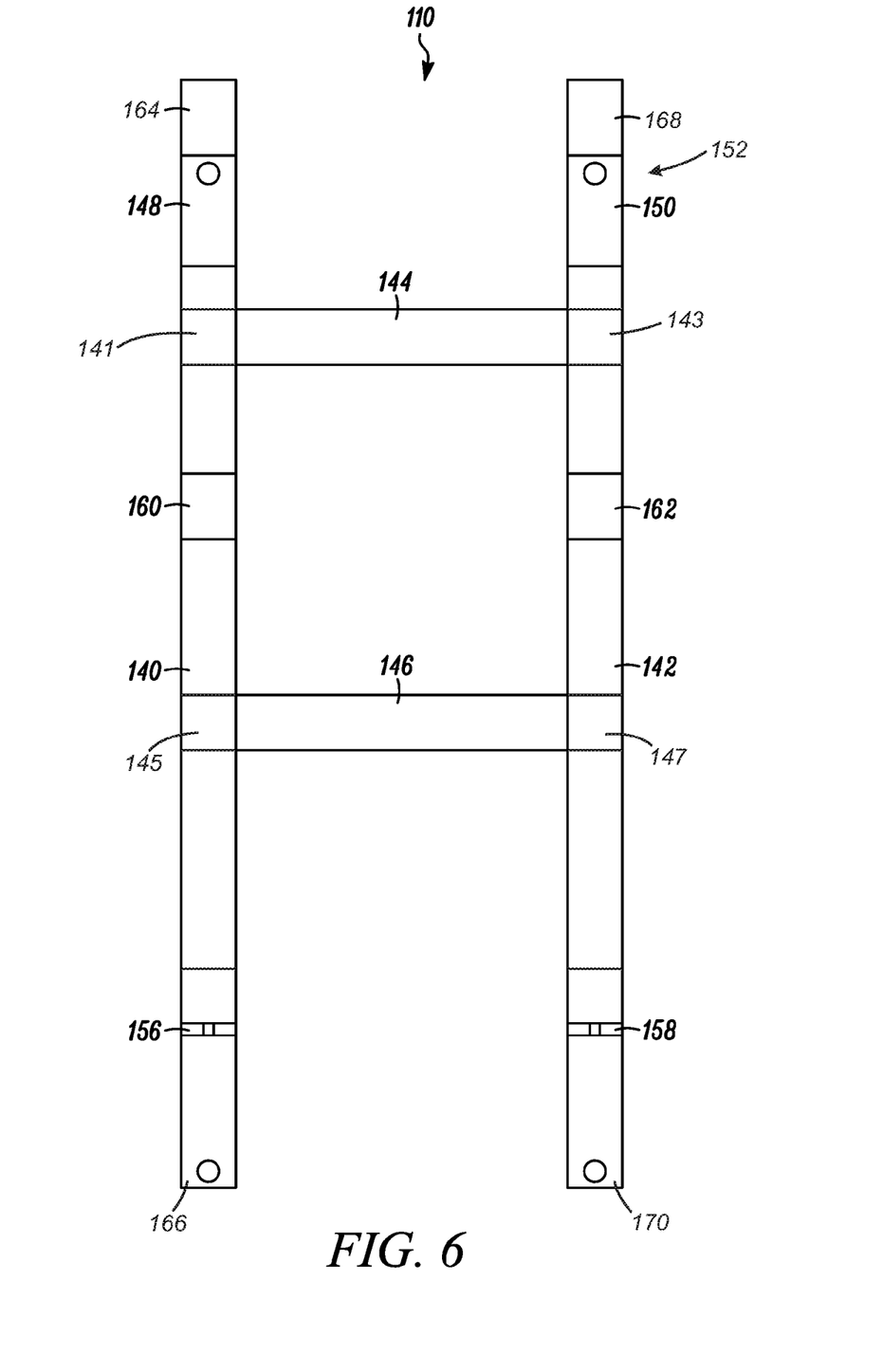
FIG. 6 shows a front view of a bagging station support frame.
Figure 7:
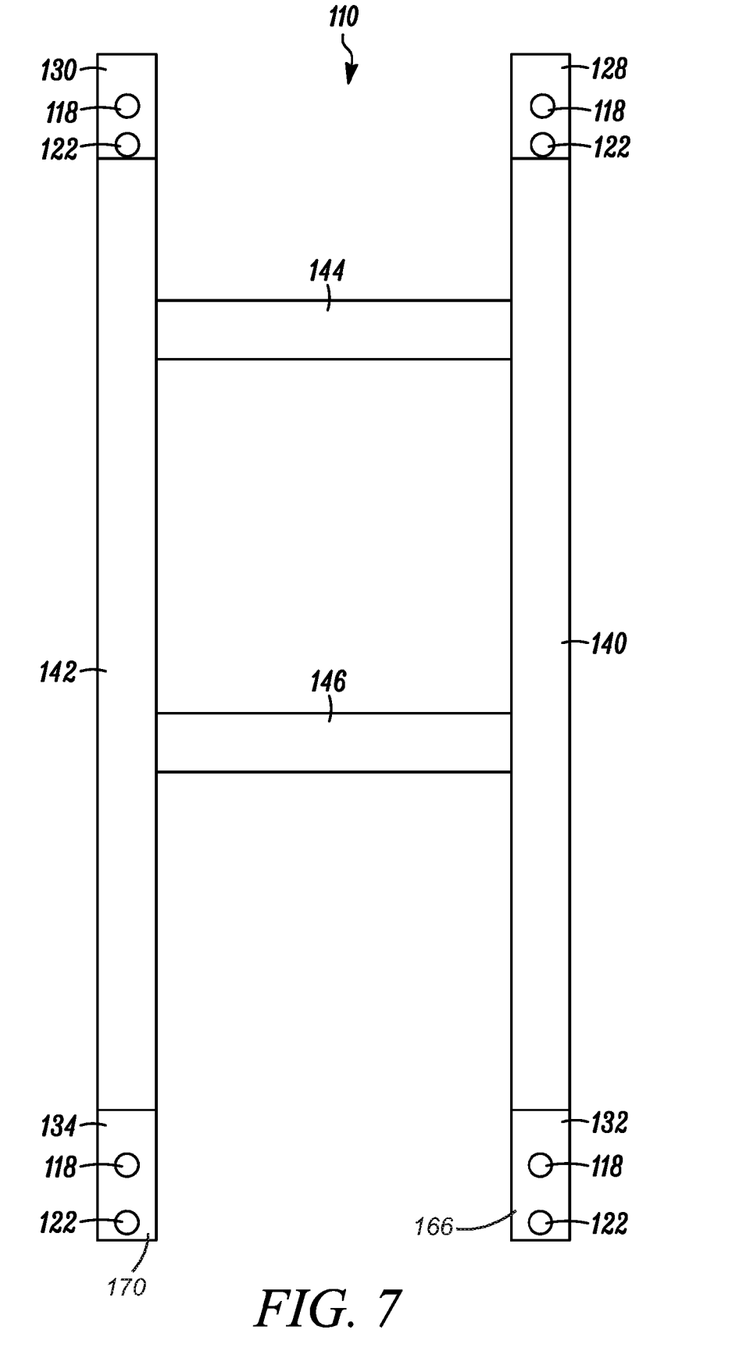
FIG. 7 shows a rear view of a bagging station support frame.

FIG. 2 through FIG. 7 show details of bagging station support frame 110. FIG. 2 shows a perspective view of bagging station support frame 110. FIG. 3 shows a side view of bagging station support frame 110. FIG. 4 and FIG. 5 show examples of means to couple the means to hold the bagging station to a rail. FIG. 6 shows a front view of bagging station support frame 110. FIG. 7 shows a rear view of bagging station support frame 110. Bagging station support frame 110 is formed of metal in the embodiments shown in the figures, but this is not meant to be limiting. Bagging station support frame can be made of any material suitable for holding bagging station 180, including plastic, wood, metal, or synthetic materials.

Bagging station support frame 110 includes a bagging station holder 112, and a rail coupler 114 coupled to the bagging station holder 112, as shown in FIG. 2. Bagging station holder 112 is a means to hold a bagging station, and rail coupler 114 is a means to couple bagging station holder 112 to a rail. The means to couple bagging station holder 112 to a rail, shown as rail coupler 114 in the figures, can take many different forms. It is to be understood that the means to couple bagging station holder 112 to a rail is not limited to the forms shown and described.

In the embodiment of bagging station support frame 110 shown in the figures, rail coupler 114 includes a first rail coupler hook set 124, and a second rail coupler hook set 126, as shown in FIG. 2. In some installations of bagging station support frame 110, first rail coupler hook set 124 couples to a first rail, and second rail coupler hook set 126 couples to a second rail.

First rail coupler hook set 124 includes a first top rail coupler hook 128 and a second top rail coupler hook 130, as shown in FIG. 2, FIG. 6, and FIG. 7. Second rail coupler hook set 126 includes a first bottom rail coupler hook 132 and a second bottom rail coupler hook 134, as shown in FIG. 2, FIG. 6, and FIG. 7. Each of first top rail coupler hook 128, second top rail coupler hook 130, first bottom rail coupler hook 132 and second bottom rail coupler hook 134 include a rail coupler hook configured to slip over a rail, and a set screw and a bolt, as can be seen best in FIG. 3, FIG. 4., and FIG. 5.

FIG. 3 shows a side view of bagging station support frame 110. First top rail coupler hook 128 and first bottom rail coupler hook 132 are each hook-shaped elements that extend around a rail. First top rail coupler hook 128 and first bottom rail coupler hook 132 each includes a set screw 118 and a bolt 122, as can be seen in FIG. 3. In this embodiment, second top rail coupler hook 130 and second bottom rail coupler hook 134 also each include a set screw and a bolt.

FIG. 4 and FIG. 5 show close-up details of first top rail coupler hook 128 coupled to a square rail (FIG. 4) and a round rail (FIG. 5). First top rail coupler hook 128 is a square rail coupler hook in this embodiment, but this is not meant to be limiting. In some embodiments, first top rail coupler hook 128 is a round rail coupler hook, or other shapes to accommodate rails of particular size or shape. Rail coupler hooks 128, 130, 132, and 134 can be any size or shape as desired to couple to particular size and shape of rails.

FIG. 4 shows first top rail coupler hook 128 coupled to square rail 120. First top rail coupler hook 128 slides over square rail 120, and is captured in first top rail coupler hook 128 by bolt 122, as shown in FIG. 4. Bolt 122 captures rail 120 in first top rail coupler hook 128 in response to first top rail coupler hook 128 extending around rail 120 and bolt 122 being slid through top rail coupler hook 128. In this embodiment, bolt 122 not only captures rail 120 in first top rail coupler hook 128, bolt 122 also extends through a first bagging station top rail holder 148 (discussed in more detail below) to capture bagging station top rail 182 in first bagging station top rail holder 148 (see FIG. 1). Set screw 118 engages rail 120, keeping bagging station support frame 110 from sliding along rail 120.

In this embodiment, second top rail coupler 130 is a mirror image of first top rail coupler 132, but this is not meant to be limiting. In some embodiments, second top rail coupler 130 is different in shape or size, for example, or has other characteristics, in order to accommodate a specific rail configuration.

FIG. 5 shows an example of first top rail coupler hook 132, which is a square-shaped hook, coupling to a round rail 121. First top rail coupler hook 132 can couple to many different shapes and sizes of rails. As mentioned earlier, in some embodiments, first top rail coupler hook 132 is a round-shaped hook, in order to better couple to round rails such as rail 121.

First bottom rail coupler hook 132 (FIG. 2 and FIG. 3) and second bottom rail coupler hook 134 (FIG. 2) are similar to first top rail coupler hook 128 in this embodiment, with a square-shaped rail coupler hook, a bolt to capture the rail in the rail coupler hook and a set screw to keep the rail coupler hook from sliding on the rail. In some embodiments, first and second bottom rail coupler hooks 132 and 134 are different from first top rail coupler hook 128, in order to accommodate a specific rail configuration, for example. In some embodiments bagging station support frame 110 does not include first and second bottom rail coupler hooks 132 and 134.

Bagging station holder 112 is a means to hold a bagging station. Bagging station holder 112 can take many different forms. Bagging station holder 112 can take any form that provides a means to hold a bagging station such as, but not limited to, bagging station 180. Bagging station holder 112 includes, among other features, a means to hold a top rail of the bagging station, which is first and second bagging station top rail holder 148 and 150 as shown in FIG. 1 and FIG. 2. First and second bagging station top rail holders 148 and 150 hold bagging station top rail 182, as shown in FIG. 1. First and second bagging station top rail holders 148 and 150 are coupled to a top end 152 of bagging station holder 112. FIG. 3, FIG. 4, and FIG. 5 show side views of first bagging station top rail holder 148. Bagging station top rail 182 slides into U-shaped first and second bagging station top rail holders 148 and 150, which helps couple bagging station 180 to bagging station support frame 110, as shown in FIG. 1. Once bagging station top rail 182 is slid into first and second bagging station top rail holders 148 and 150, bolts 122 on each of first and second bagging station top rail holders 148 and 150 captures bagging station top rail 182 in first and second bagging station top rail holders 148 and 150. It is to be understood that the means to hold a top rail of bagging station 180 can take many different forms. Any form that holds bagging station top rail 182 can be used.

Bagging station holder 112 also includes a means to hold a bagging station middle rail 184, as shown in FIG. 1. In the embodiment shown in the figures, means to hold a bagging station middle rail 184 takes the form of first and second bagging station middle rail holders 160 and 162, see FIG. 1, FIG. 2, and FIG. 6. First and second bagging station middle rail holders 160 and 162 capture and hold bagging station middle rail 184, as shown in FIG. 1. First and second bagging station middle rail holders 160 and 162 in this embodiment are U-shaped structures which hold bagging station middle rail 184, helping to couple bagging station 180 to bagging station support frame 110. It is to be understood that means to hold bagging station middle rail 184 can take many different forms other than those shown and described. Any form that holds bagging station middle rail 184 can be used.

Bagging station holder 112 also includes a means to support a bottom plate 186 of bagging station 180. Means to support bottom plate 186 of bagging station 180 can take many different forms. In the embodiment shown in the figures, means to support bottom plate 186 of bagging station 180 takes the form of bottom structure 138 as shown in FIG. 2. Bottom structure 138 supports bottom plate 186 of bagging fixture 180. Bottom plate 186, supported by bottom structure 138, supports shopping bags and the products in the shopping bags while they are being filled. Bottom structure 138 can take many different forms. In the embodiment of bagging station support frame 110 shown in the figures, bottom structure 138 takes the form of first and second bottom plate support bar 156 and 158, as shown in FIG. 1, FIG. 2, and FIG. 3. First and second bottom plate support bars 156 and 158 are two bars that extend from bagging station holder 112 and support bottom plate 186 of bagging station 180. First and second bottom plate support bars 156 and 158 provide support for bottom plate 186 from underneath bottom plate 186. In some embodiments, bolts 198 (FIG. 3) pass through bottom plate 186 into first and second bottom plate support bar 156 and 158, coupling bottom plate 186 to first and second bottom plate support bar 156 and 158. In some embodiments, bolts 198 are not used to couple bottom plate 186 to first and second bottom plate support bar 156 and 158. Means to support bottom plate 186 is in the form of two support bars in this embodiment, but this is not meant to be limiting. Means to support bottom plate 186 can be a single bar, a plate, a plurality of rails, rods, or bars, or any structure which supports bottom plate 186.

Bagging station holder 112 in the embodiment shown in the figures includes a back structure 136, and bottom structure 138 coupled to back structure 136, as shown in FIG. 2. Back structure 136 provides the basic structural support and interconnect for the elements of bagging station support frame 110. Bottom structure 138 is the means to support bottom plate 186 of bagging station 180, as discussed above.

Back structure 136 can take many different forms. In the embodiment of bagging station support frame 110 shown in the figures, back structure 136 includes a first support bar 140 extending between first top rail coupler hook 128 and first bottom rail coupler hook 132, as shown in FIG. 2, FIG. 3, FIG. 6, and FIG. 7. First support bar 140 is a strap of rigid material, metal in this embodiment, with a first support bar top end 164 and a first support bar bottom end 166. First support bar 140 forms part of the structural frame of bagging station support frame 110 and provides the mounting structure for other elements of bagging station support frame 110. In this embodiment, first top rail coupler hook 128, first bagging station top rail holder 148, first bagging station middle rail holder 160, first bottom plate support bar 156, and first bottom rail coupler hook 132 are all coupled to first support bar 140 (FIG. 2 and FIG. 3). First top rail coupler hook 128 is coupled to first support bar top end 164 of first support bar 140. First bottom rail coupler hook 132 is coupled to first support bar bottom end 166 of first support bar 140.

Back structure 136 also includes a second support bar 142 extending between second top rail coupler hook 130 and second bottom rail coupler hook 134, as shown in FIG. 2, FIG. 6, and FIG. 7. Second support bar 142 is a strap of rigid material, metal in this embodiment, with a second support bar top end 168 and a second support bar bottom end 170. Second support bar 142 forms part of the structural frame of bagging station support frame 110 and provides the mounting structure for other elements of bagging station support frame 110. In this embodiment, second top rail coupler hook 130, second bagging station top rail holder 150, second bagging station middle rail holder 162, second bottom plate support bar 158, and second bottom rail coupler hook 134 are all coupled to second support bar 142. Second top rail coupler hook 130 is coupled to second support bar top end 168 of second support bar 142. Second bottom rail coupler hook 134 is coupled to second support bar bottom end 170 of second support bar 142.

Back structure 136 also includes first coupler bar 144 and second coupler bar 146. First coupler bar 144 and second coupler bar 146 are a means to connect first and second support bar 140 and 142 to each other, as shown in FIG. 2, FIG. 6, and FIG. 7. Each of first and second coupler bars 140 and 142 extend between and are coupled to first support bar 140 and second support bar 142. First coupler bar 144 is a length of rigid material with a first coupler bar first end 141 and a first coupler bar second end 143 opposing first coupler bar first end 141. First coupler bar first end 141 is coupled to first support bar 140. First coupler bar second end 143 is coupled to second support bar 142. Second coupler bar 146 is a length of rigid material with a second coupler bar first end 145 and a second coupler bar second end 147 opposing second coupler bar first end 145. Second coupler bar first end 145 is coupled to first support bar 140. Second coupler bar second end 147 is coupled to second support bar 142. First and second support bars 140 and 142, and first and second coupler bars 144 and 146 form the basic structure and frame of bagging station support frame 110. Back structure 136 can take many other forms. Any form for back structure 136 that supports the elements of bagging station 110 can be used.

Figure 8:
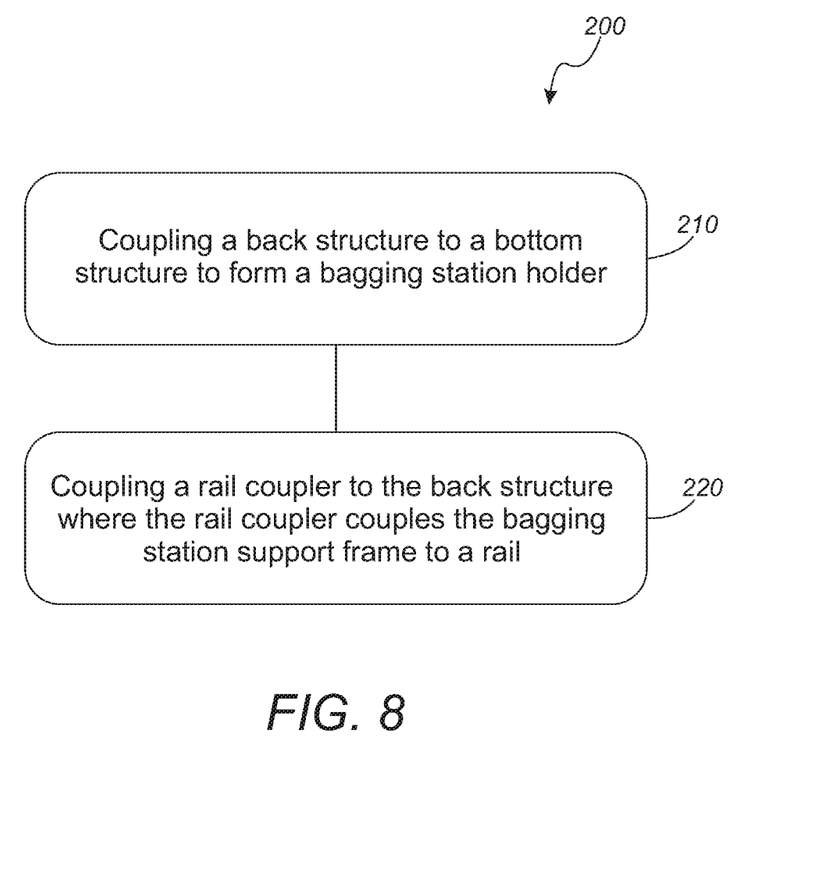
FIG. 8 illustrates a method of forming a bagging station support frame.

FIG. 8 illustrates a method 200 of forming a bagging station support frame. Method 200 includes an act 210 of coupling a back structure to a bottom structure to form a bagging station holder. Method 200 also includes an act 220 of coupling a rail coupler to the back structure, where the rail coupler couples the bagging station support frame to a rail. Method 200 can include many other acts. In some embodiments, coupling the back structure to the bottom structure includes coupling the bottom structure to a bottom end of the back structure.

In some embodiments, method 200 includes forming a back structure. In some embodiments, forming a back structure includes coupling a first coupler bar first end of a first coupler bar to a first support bar. The first support bar is a first length of rigid material with a first support bar top end and a first support bar bottom end. In some embodiments, forming a back structure includes coupling a first coupler bar second end to a second support bar. The second support bar is a second length of rigid material with a second support bar top end and a second support bar bottom end. In some embodiments, forming a back structure includes coupling a second coupler bar first end of a second coupler bar to the first support bar. In some embodiments, forming a back structure includes and coupling a second coupler bar second end to the second support bar.

In some embodiments, method 200 includes coupling a first and a second bagging station top rail holder to a top end of the back structure. In some embodiments, method 200 includes coupling a first and a second bagging station middle rail holder to the back structure.

In some embodiments, act 220 of coupling a rail coupler to the bagging station holder includes coupling a first top rail coupler hook to the first support bar top end. In some embodiments, act 220 of coupling a rail coupler to the bagging station holder includes coupling a first bottom rail coupler hook to the first support bar bottom end. In some embodiments, act 220 of coupling a rail coupler to the bagging station holder includes coupling a second top rail coupler hook to the second support bar top end. In some embodiments, act 220 of coupling a rail coupler to the bagging station holder includes coupling a second bottom rail coupler hook to the second support bar bottom end.

A bagging station support frame has been shown and described, and a method of forming a bagging station support frame. The bagging station support frame can be coupled to a rail in various locations throughout a retails store. The bagging station support frame holds a bagging station. The bagging station support frame with a bagging station coupled to it provides a place where customers and employees of the retail store can bag purchases. With electronic and self-checkout, customers no longer are required to go to a checkout counter to pay for and bag their purchases. But many will still want to bag their purchases, even if they pay for their purchases electronically while they shop. Having bagging stations mounted to bagging station support frames at various locations in the retail store will help customers conveniently and easily bag their purchases as they shop.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above. For example, the bagging station support frame shown and describe is formed of multiple separate elements. In some embodiments, a bagging station support frame according to the invention is formed of one integral piece of material, molded or otherwise.

The invention claimed is:

1. A bagging station support frame comprising:
   a bagging station holder comprising:
      a back structure comprising:
         a first support bar;
         a second support bar; and
         a first and a second coupler bar, wherein each of the first and the second coupler bars are coupled to and extend between the first support bar and the second support bar; and
      a bottom structure coupled to the back structure, wherein the bottom structure comprises:
         a first bottom plate support bar coupled to the first support bar, wherein the first bottom plate support bar is a straight bar extending from the first support bar, and wherein the first bottom plate support bar is perpendicular to the first support bar; and
         a second bottom plate support bar coupled to the second support bar, wherein the second bottom plate support bar is a straight bar extending from the second support bar, and wherein the second bottom plate support bar is perpendicular to the second support bar;
   and
   a rail coupler coupled to the bagging station holder, wherein the rail coupler comprises a rail coupler hook with a set screw and a bolt, and wherein the bolt extends through the rail coupler hook and the first support bar;
   wherein the rail coupler couples the bagging station support frame to a rail.

2. The bagging station support frame of claim 1, wherein the rail coupler hook comprises a square rail coupler hook.

3. The bagging station support frame of claim 2, wherein the bolt captures the rail in the square rail coupler hook in response to the square rail coupler hook extending around the rail.

4. The bagging station support frame of claim 1, wherein the rail coupler hook comprises a round rail coupler hook.

5. The bagging station support frame of claim 1, wherein the rail coupler comprises a first rail coupler hook set and a second rail coupler hook set.

6. The bagging station support frame of claim 5, wherein the rail coupler hook is a first top rail coupler hook, and wherein the first rail coupler hook set comprises the first top rail coupler hook and a second top rail coupler hook, and wherein the second rail coupler hook set comprises a first bottom rail coupler hook and a second bottom rail coupler hook.

7. The bagging station support frame of claim 6, wherein
   the first support bar extends between the first top rail coupler hook and the first bottom rail coupler hook; and
   the second support bar extends between the second top rail coupler hook and the second bottom rail coupler hook.

8. The bagging station support frame of claim 7, further comprising a first and a second bagging station top rail holder coupled to the first and the second support bar, respectively.

9. The bagging station support frame of claim 8, further comprising a first and a second bagging station middle rail holder coupled to the first and the second support bar, respectively.

10. A method of forming a bagging station support frame, the method comprising:
   forming a back structure, wherein forming the back structure comprises:
      coupling a first coupler bar first end of a first coupler bar to a first support bar, wherein the first support bar is a first length of rigid material with a first support bar top end and a first support bar bottom end;
      coupling a first coupler bar second end to a second support bar, wherein the second support bar is a second length of rigid material with a second support bar top end and a second support bar bottom end;
      coupling a second coupler bar first end of a second coupler bar to the first support bar;
      and
      coupling a second coupler bar second end to the second support bar;

coupling a bottom structure to the back structure, wherein the bottom structure comprises:
  a first bottom plate support bar coupled to the first support bar, wherein the first bottom plate support bar is a straight bar extending from the first support bar, and wherein the first bottom plate support bar is perpendicular to the first support bar; and
  a second bottom plate support bar coupled to the second support bar, wherein the second bottom plate support bar is a straight bar extending from the second support bar, and wherein the second bottom plate support bar is perpendicular to the second support bar;
and
coupling a rail coupler to the first support bar top end, wherein the rail coupler couples the bagging station support frame to a rail, and wherein the rail coupler comprises a first top rail coupler hook, a set screw and a bolt, and wherein the bolt extends through the first top rail coupler hook and the first support bar.

11. The method of claim 10, wherein the coupling the back structure to the bottom structure comprises:
  coupling the first bottom plate support bar to the first support bar bottom end; and
  coupling the second bottom plate support bar to the second support bar bottom end.

12. The method of claim 11, further comprising:
  coupling a first and a second bagging station top rail holder to a top end of the back structure; and
  coupling a first and a second bagging station middle rail holder to the back structure.

13. The method of claim 12, wherein the method further comprises:
  coupling a first bottom rail coupler hook to the first support bar bottom end;
  coupling a second top rail coupler hook to the second support bar top end; and
  coupling a second bottom rail coupler hook to the second support bar bottom end.

* * * * *